United States Patent

[11] 3,582,647

| [72] | Inventors | Maurice G. Figuet<br>Vieux Thann;<br>Gerard Rottner, Thann; Andre Louis<br>Michaud, Vieux Thann, all of, France |
|---|---|---|
| [21] | Appl. No. | 859,492 |
| [22] | Filed | Aug. 27, 1969 |
| [45] | Patented | June 1, 1971 |
| [73] | Assignee | Fabriques de Produits Chimiques de Thann et de Mulhouse<br>Thann, France<br>Continuation of application Ser. No. 666,149, Sept. 7, 1967, now abandoned. |

[54] APPARATUS FOR DETERMINING THE DENSITY OF PULVERALENT MATERIALS IN A RESERVOIR BY MEANS OF A RADIOACTIVE SOURCE AND DETECTOR
7 Claims, 7 Drawing Figs.

[52] U.S. Cl. .................................................. 250/43.5,
250/83.3

[51] Int. Cl. ........................................................ G01n 23/12
[50] Field of Search ............................................ 250/43.5 D,
83.3 FL

[56] References Cited
UNITED STATES PATENTS

| 3,099,744 | 7/1963 | Spooner ....................... | 250/43.5 |
|---|---|---|---|
| 3,100,841 | 8/1963 | Reider........................... | 250/43.5 |
| 3,230,363 | 1/1966 | Prellwitz....................... | 250/43.5 |
| 3,248,541 | 4/1966 | Crump ......................... | 250/43.5 |

FOREIGN PATENTS

| 385,517 | 3/1965 | Switzerland.................. | 250/43.5 |

Primary Examiner—Archie R. Borchelt
Attorneys—Albert C. Johnston, Alvin Sinderband, Robert E. Isner and Lewis H. Islinger ABSTRACT: Apparatus and process for checking the flow of pulverulent materials contained in a reservoir, which consists of measuring the absorption of an electromagnetic radiation of suitable frequency by the mass of material situated in the reservoir at the level of measurement.

INVENTORS
MAURICE G. FIGUET
GERARD ROTTNER
ANDRE L. MICHAUD
BY Albert C. Johnston
ATTORNEY INVENTORS
MAURICE G. FIGUET
GERARD ROTTNER
ANDRE L. MICHAUD
BY Albert C. Johnston
ATTORNEY

3,582,647

APPARATUS FOR DETERMINING THE DENSITY OF PULVERALENT MATERIALS IN A RESERVOIR BY MEANS OF A RADIOACTIVE SOURCE AND DETECTOR

This application is a continuation of Ser. No. 666,149, filed Sept. 7, now abandoned. This invention relates to apparatus such as industrial reservoirs containing pulverulent materials capable of being removed by continuous or discontinuous operation and to methods of using such reservoirs. These reservoirs may be storage towers, silos etc., or the storage capacity in the lower part of treatment apparatus such as cyclones, decantation chambers, electrofilters etc.

Stored pulverulent materials are generally very sensitive to the external atmosphere and above all to the degree of humidity of the atmosphere. If these powders are not completely dry they tend to stick to the walls of the reservoir in which they are stored. Furthermore they often contain solid constituents and/or gases which are prone to react with air and/or water vapor contained in the air, and this frequently causes changes and the formation of agglomerates.

These various possibilities are liable to result in the interference with, or even the prevention of, the free flow of the pulverulent materials. It is thus necessary to check the flow and/or the state of fullness of the reservoir. Such checking should preferably be carried out from outside of the reservoir so as to avoid bringing the pulverulent materials into contact with the atmosphere.

Thus the invention proposes both apparatus and a process for checking the flow of pulverulent materials contained in a reservoir which is easily carried out, can be read with a minimum of delay and is very precise, while avoiding contact between the pulverulent materials and the atmosphere.

According to one aspect of the present invention there is provided a process for checking the flow of pulverulent materials contained in a reservoir, wherein there is arranged, outside of the reservoir, both a source of electromagnetic radiations and a detector of the radiations in such a way that the path of the radiations between the source and the detector is able to pass through material in the reservoir, and the radiations are of such a frequency that the amount by which they are absorbed by the material is measured by the detector.

According to another aspect of the invention there is provided apparatus for checking the flow of pulverulent materials contained in a reservoir, wherein there is arranged, outside of the reservoir, both a source of electromagnetic radiations and a detector of the radiations in such a way that the path of the radiations between the source and the detector is able to pass through material in the reservoir, and wherein the radiations are of such a frequency that the amount by which they are absorbed is measured by the detector.

Embodiments of the invention will now be described with reference to the accompanying drawings in which.

Figure 1:
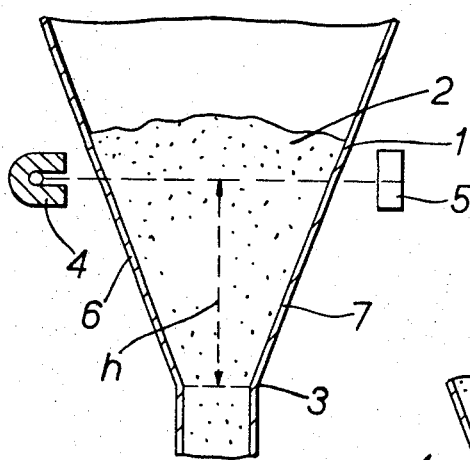
FIG. 1 is a schematic cross section illustrating a basic construction.

Referring to FIG. 1 there is shown the lower part of a reservoir 1 which contains pulverulent materials 2 which are capable of being passed through the outlet 3. An electromagnetic radiation source 4 and a radiation counter 5 are provided opposite one another on either side of the reservoir 1, at a level $h$ from the outlet 3. Experiments have shown that the electromagnetic radiation which is most suitable for industrial purposes, taking into account the absorbing power of the pulverulent materials being treated, is a gamma radiation, with the counter 5 thus being a Geiger counter.

The gamma rays emitted by the source 4 traverse the walls 6 and 7 of the reservoir 1, which walls absorb a part of the radiation. If the level of the material in the reservoir is above $h$, the gamma rays furthermore traverse, between the walls 6 and 7, a thickness of material which absorbs a further part of the radiation. Measurement of this second absorption by means of the Geiger counter 5 determines the presence or absence of pulverulent materials at the measurement level.

Figure 2:
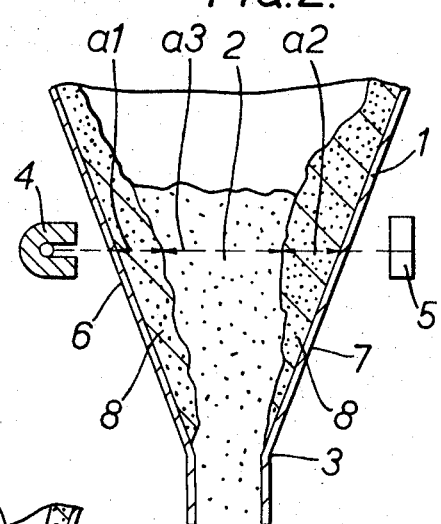
FIG. 2 is a schematic cross section showing the arrangement of FIG. 1 after operation.

Referring now to FIG. 2 it can be seen that after a period of operation the reservoir 1 has become coated on its internal faces by a deposit 8 of the material; the material deposited on the wall 6 is traversed by the gamma rays over a distance $a1$ while the material on the wall 7 is traversed by the gamma rays over a distance $a2$. The thickness of pulverulent material 2 which is traversed by the gamma rays is $a3$.

In one application of the arrangement of FIG. 2 the apparatus is installed in a factory manufacturing titanium tetrachloride and producing about 104 kg./hour of residues consisting of fines of coke, rutile mineral, silica, zircon and various chlorides (e.g. Fe, Al, V).

These residues are hot (around 150 to 200° C.) and give off corrosive and irritant fumes. They are stored in a conical steel hopper which is emptied every 8 hours. In order to check that emptying takes place completely, a source 4 of gamma rays (cobalt 60 of 4.8 mC) and a Geiger counter 5 have been provided at a height 680 mm. above the outlet 3 of the hopper.

When, during the course of filling the reservoir or hopper, the residues, the density of which is 0.47, reach this level after running for about 1 hour, the mass of the solids, which become interposed between the source and the counter, absorbs a part of the radiation and the Geiger counter indicates that the hopper is filling.

Eight hours later, when the hopper is being emptied, the Geiger counter indicates whether this operation is taking place correctly.

The counter 5 is located at 1550 mm. from the source 4 and without the interposition of the hopper it reads 2.26 mr./hr. The steel walls of the empty hopper, of thickness 10 mm., absorb 50 percent of this radiation and with only the empty hopper the counter 5 reads 1.13 mr./hr. When the hopper is full, the gamma rays additionally traverse the thickness of the mass of residues amounting to a distance of 1 m. and the value recorded by the counter 5 falls to 0.14 mr./hr.

The schematic arrangement represented in FIG. 1 shows a flow which is not impeded by deposits on the walls in the measurement zone. If the products are moist and sticky, however, they can form deposits on the walls in the measurement zone (FIG. 2) and interference with the recording may result, particularly if the apparent density of the residues is variable (for example from 0.2 to 0.8).

In the example shown in FIG. 2, the distances $a1$, $a2$ and $a3$ are respectively 100 mm., and 700 mm., and 150 mm.

The deposit 8 has a density of 0.8 while that of the product is 0.3. When the hopper is apparently empty, the deposit 8 remains stuck to the walls in the form of a crust and the counter 5 reads 0.4 mr./hr., i.e. essentially the same value as for a hopper which is not covered with a crust but is filled with a residue of density 0.2. When the hopper is filled with a residue of density 0.3, the counter 5 indicates 0.24 mr./hr., the difference being 0.12 mr./hr., i.e. only about twice the sensitivity of the Geiger counter.

Figure 3:
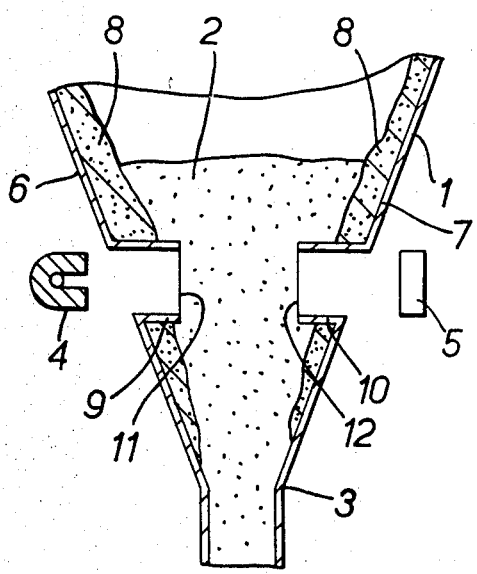
FIGS. 3 to 7 show schematic cross sections of modifications of the arrangement of FIG. 1.

It will thus be seen that determining the degree of filling of the hopper becomes extremely unreliable. In order to reduce the effect of this disadvantage, a preferred embodiment of the invention as shown in FIG. 3 has been developed for use under particular conditions. The apparatus shown in FIG. 3 is, in some respects, similar to that of FIG. 2 and the same reference numbers denote similar parts.

The hopper 1 is provided with two blind tubes 9 and 10 pointing towards the inside of the hopper and respectively facing the source 4 and the Geiger counter 5.

At their end within the hopper 1 the tubes 9 and 10 are each closed by a wall respectively marked 11 and 12, which is preferably thinner than the wall of the hopper (for example of 1 mm. thickness) and made of stainless steel, so as to reduce the absorption of gamma rays and thereby allow better utilization of the power from the source. For the same purpose, the tubes 9 and 10 can be made quite long so as to reduce the thickness of the mass of pulverulent materials traversed by the gamma rays.

The tubes 9 and 10 are of sufficient diameter to pass a suitable flux of gamma rays, but their sizes must be sufficiently low that the flow should not be interfered with and that in particular sizable crusts cannot form on the ends of the tubes. For example the diameter of the tube 9 may be 80 mm. and that of the tube 10 180 mm. The cross section of these tubes may be circular, rectangular or square, or they may be of any other suitable shape. The long length which the tubes 9 and 10 are advantageously given makes it possible, in addition to the advantage described above, to space the bottoms 11 and 12 of the tubes 9 and 10 away from the walls 6 and 7 of the hopper 1, where considerable crusts frequently form.

Figure 4:
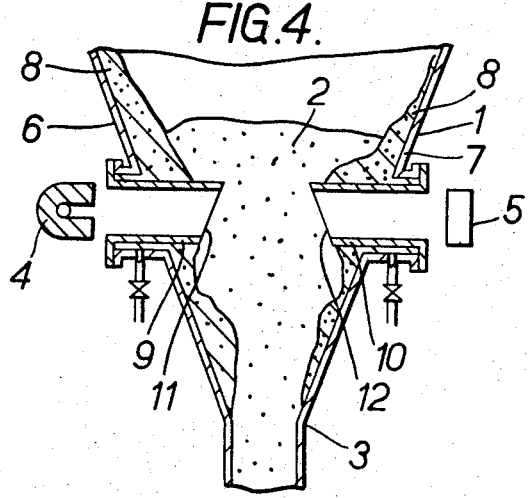

FIG. 4 describes an improvement of the device of FIG. 3 and the same reference numbers denote similar components. The ends 11 and 12 of the tubes 9 and 10 are inclined downwards, in order to reduce the possibility of, or at least to limit, crusts forming on these ends and to facilitate their detachment during emptying.

Figure 5:
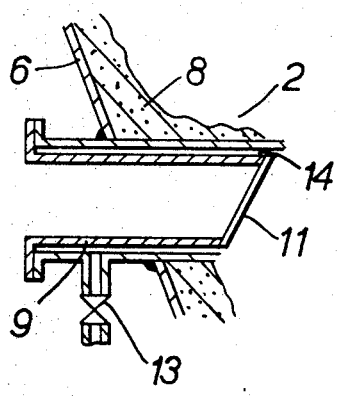
Figure 6:
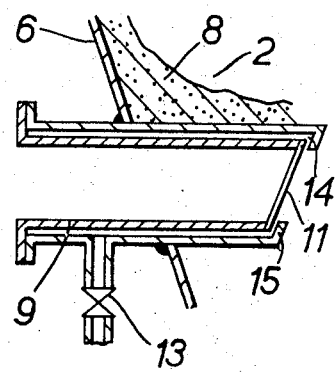

The tubes 9 and 10 may be provided, as shown in FIG. 5, with a device which blows compressed gas, for example dry air or nitrogen, around the ends 11 and 12 via a coaxially arranged tube and a pump 13 so that the gas is blown through a peripheral outlet 14. Furthermore as shown in FIG. 6 it is possible to provide for the peripheral outlet 14 to comprise a turnedover edge 15 so as to deflect the flow of compressed gas which thus sweeps the surface of the end of the tube.

Figure 7:
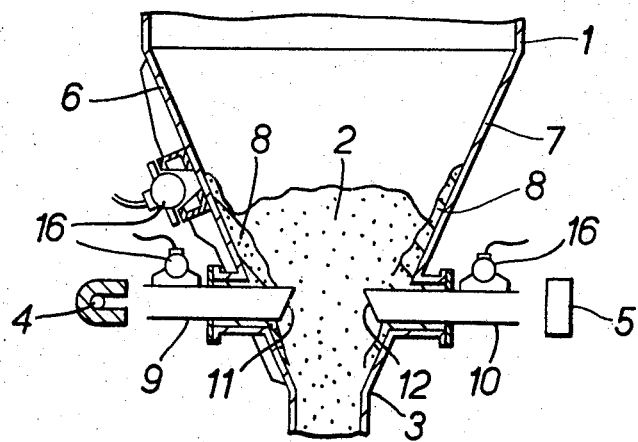

In order to remove the crusts more completely, the walls 6 and 7 of the hopper 1 and/or the tubes 9 and 10 may, as shown in FIG. 7, be provided with conventional electrical pneumatic, rotary or magnetic vibrators 16. If the vibrators 16 are mounted on the tubes 9 and 10 then these may be extended in length. In all cases the vibrations are easily transmitted to the ends 11 and 12 of the tubes 9 and 10.

The source 4 of 4.8 mC, previously described, shows an intensity of 2.1 mr./hr. on the reading of the counter 5 when the hopper is empty, the distance between the course 4 and the counter 5 being 1550 mm., the thickness of the ends 11 and 12 being 1 mm. and the distance between these ends being 800 mm.

When the hopper is full, the values read on the counter 5 vary as a function of the density of the residues. For example:

| Density: | Intensity in mr./hr. |
| --- | --- |
| 0.3 | 0.73 |
| 0.47 | 0.40 |
| 0.5 | 0.126 |

It is found that checking is easier when interference due to the crusts is eliminated. The intensity of the source is better used and the measurements are carried out far from the sensitivity limit of the apparatus.

The preceding results show that the measurements carried out also allow the density of the products treated to be determined. For example, in the case of residues from the chlorination of rutile the degree of drying of the residues can thus be determined, because when they are moistened with titanium tetrachloride their density increases very rapidly and the intensity measured by the Geiger counter 5 then assumes a very low value (0.06 mr./hr.).

Although in the embodiments described only one path at one level has been shown there may, of course, be several paths for the radiations at different levels.

Though the invention has been described in relation to particular example, it will be understood that it is in no way limited thereto and that different variants may be introduced into it without going outside the scope and spirit of the invention.

We claim:

1. Apparatus for checking the level or the density of a mass of pulverulent mineral residues in a normally closed hopper, said hopper including downwardly convergent sidewalls defining a reservoir for such mass and having an outlet at the bottom thereof for delivering material therefrom by gravity flow, comprising two tubular members protruding through said sidewalls into said reservoir from opposite sides thereof at a level above said outlet, said tubular members being aligned axially one with the other and having respective inner ends closed off by end walls thereof and spaced apart inside said reservoir, means associated with the outer end of one of said tubular members for directing electromagnetic radiation axially along the spaces inside said members so as to pass the radiation through said end walls and any mass of material lying in the space between them, said end walls being composed of a material pervious to said radiation, and means associated with the outer end of the other of said tubular members for detecting the amount of said radiation transmitted through said end walls and any such mass of material.

2. Apparatus according to claim 1, said first-recited means being a source of gamma radiation and each of said end walls being a thin sheet of stainless steel.

3. Apparatus according to claim 1, said first-recited means being a source of gamma radiation and said second recited means being a Geiger counter.

4. Apparatus according to claim 1, and means for conducting forced streams of gas about said tubular members and directing said streams over the faces of said end walls inside said reservoir.

5. Apparatus according to claim 1, the face of each of said end walls being sloped from the top thereof downwardly and outwardly in the direction away from the path of material falling between said end walls toward said outlet.

6. Apparatus according to claim 1, and means mounted on each of said tubular members for vibrating said members so as to prevent material in said reservoir from accumulating on said end walls.

7. Apparatus for checking the level or the density of a mass of pulverulent mineral residues in a normally closed hopper, said hopper including downwardly convergent sidewalls defining a reservoir for such mass and having an outlet at the bottom thereof for delivering material therefrom by gravity flow, comprising two tubular members protruding through said sidewalls into said reservoir from opposite sides thereof at a level above said outlet, said tubular members being aligned axially one with the other and having respective inner ends closed off by end walls thereof and spaced apart inside said reservoir, means associated with the outer end of one of said tubular members for directing gamma radiation axially along the spaces inside said members so as to pass the radiation through said end walls and any mass of material lying in the space between them, said end walls being composed of a material pervious to said radiation, a Geiger counter associated with the outer end of the other of said tubular members for detecting the amount of said radiation transmitted through said end walls and any such mass of material, the inner face of each of said end walls being sloped from the top thereof downwardly and outwardly in the direction away from the path of material falling between said end walls toward said outlet, and means for conducting forced streams of gas about said tubular members and directing said streams over the inner faces of said end walls inside said reservoir to prevent the formation of deposits on said faces.